(12) United States Patent
Dherde et al.

(10) Patent No.: US 11,911,950 B2
(45) Date of Patent: *Feb. 27, 2024

(54) METHOD FOR FORMING A VACUUM INSULATED STRUCTURE

(71) Applicant: WHIRLPOOL CORPORATION, Benton Harbor, MI (US)

(72) Inventors: Eric J. Dherde, St. Joseph, MI (US); Gustavo Frattini, St. Joseph, MI (US); Abhay Naik, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/872,208

(22) Filed: Jul. 25, 2022

(65) Prior Publication Data

US 2022/0355532 A1 Nov. 10, 2022

Related U.S. Application Data

(62) Division of application No. 17/128,265, filed on Dec. 21, 2020, now Pat. No. 11,433,590, which is a (Continued)

(51) Int. Cl.
*B29C 51/10* (2006.01)
*F16L 59/02* (2006.01)
(Continued)

(52) U.S. Cl.
CPC ............ *B29C 51/10* (2013.01); *F16L 59/028* (2013.01); *F16L 59/065* (2013.01);
(Continued)

(58) Field of Classification Search
CPC ...... B29C 51/10; F16L 59/028; F16L 59/065; F25D 23/065; F25D 23/066; F25D 2201/14; B29L 2031/7622
See application file for complete search history.

(56) References Cited

U.S. PATENT DOCUMENTS

| 2,318,744 A | 5/1943 | Brown |
| 2,356,827 A | 8/1944 | Coss et al. |

(Continued)

FOREIGN PATENT DOCUMENTS

| EP | 0645576 | 3/1995 |
| EP | 3330650 | 6/2018 |

(Continued)

*Primary Examiner* — Rick K Chang
(74) *Attorney, Agent, or Firm* — Price Heneveld LLP

(57) ABSTRACT

A method of forming a vacuum insulated structure includes providing a structural envelope an insulating cavity defined within the structural envelope. An expanding device is attached to opposing outer walls of the structural envelope and the interior cavity is expanded by pulling the opposing outer walls away from one another to define an expanded state. An insulating material is disposed within the insulating cavity to occupy substantially all of the insulating cavity in the expanded state. Gas is expressed from the insulating cavity to collapse the structural envelope to a final state and a final interior volume that is less than the expanded interior volume. The final state of the structural envelope defines a densified state of the insulating material within the insulating cavity. The vacuum port is then closed to hermetically seal the insulating cavity.

20 Claims, 12 Drawing Sheets

Related U.S. Application Data division of application No. 16/301,921, filed as application No. PCT/US2016/054639 on Sep. 30, 2016, now Pat. No. 10,906,231.

(51) Int. Cl.
*F16L 59/065* (2006.01)
*F25D 23/06* (2006.01)
*B29L 31/00* (2006.01)

(52) U.S. Cl.
CPC ......... *F25D 23/065* (2013.01); *F25D 23/066* (2013.01); *B29L 2031/7622* (2013.01); *F25D 2201/14* (2013.01)

(56) References Cited

U.S. PATENT DOCUMENTS

| | | |
|---|---|---|
| 2,559,356 A | 7/1951 | Hedges |
| 3,258,883 A | 7/1966 | Campanaro et al. |
| 3,358,059 A | 12/1967 | Snyder |
| 3,841,479 A | 10/1974 | Szatkowski |
| 3,882,637 A | 5/1975 | Lindenschmidt |
| 4,486,482 A | 12/1984 | Kobayashi et al. |
| 5,044,705 A | 9/1991 | Nelson |
| 5,252,408 A | 10/1993 | Bridges et al. |
| 5,270,092 A | 12/1993 | Griffith et al. |
| 5,509,248 A | 4/1996 | Dellby et al. |
| 5,716,581 A | 2/1998 | Tirrell et al. |
| 5,865,037 A | 2/1999 | Bostic |
| 6,492,000 B1 | 12/2002 | Matsuki et al. |
| 6,630,097 B1 | 10/2003 | Maritan et al. |
| 8,881,398 B2 | 11/2014 | Hanley et al. |
| 9,221,210 B2 | 12/2015 | Wu et al. |
| 10,030,905 B2 | 7/2018 | Allard et al. |
| 10,041,724 B2 | 8/2018 | Allo et al. |
| 10,906,231 B2 * | 2/2021 | Dherde ............ F25D 23/066 |
| 2013/0257257 A1 | 10/2013 | Cur et al. |
| 2013/0270732 A1 | 10/2013 | Wu et al. |
| 2015/0241118 A1 | 8/2015 | Wu |
| 2017/0160001 A1 | 6/2017 | Deka et al. |

FOREIGN PATENT DOCUMENTS

| | | |
|---|---|---|
| JP | 04309778 | 11/1992 |
| JP | 11159693 | 6/1999 |
| WO | 2007033836 | 3/2007 |

\* cited by examiner

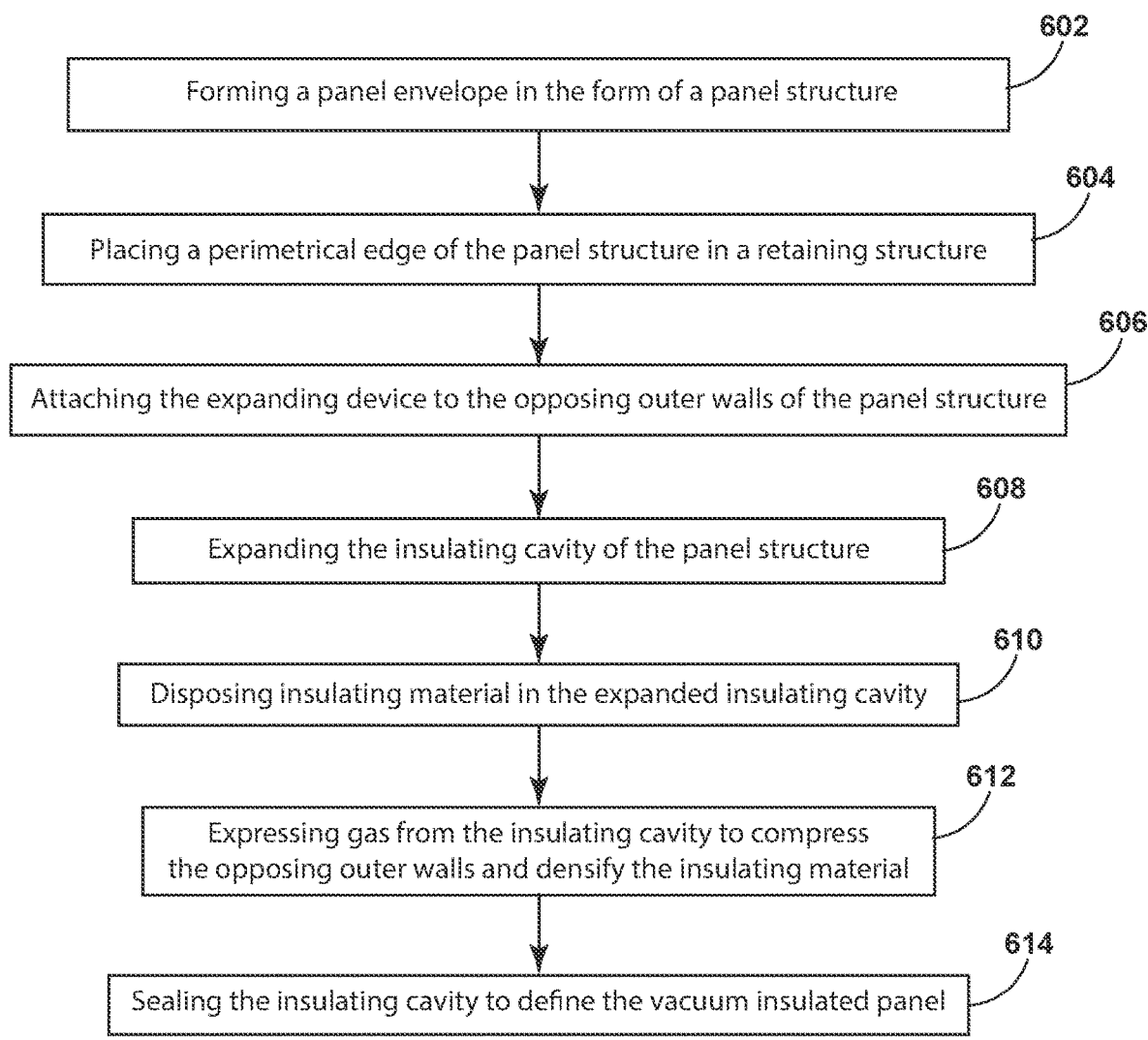

METHOD FOR FORMING A VACUUM INSULATED STRUCTURE

CROSS-REFERENCE TO RELATED APPLICATIONS

The present application is a divisional of U.S. patent application Ser. No. 17/128,265 filed Dec. 21, 2020, entitled METHOD FOR FORMING A VACUUM INSULATED STRUCTURE, now U.S. Pat. No. 11,433,590, which is a divisional of U.S. patent application Ser. No. 16/301,921 filed Nov. 15, 2018, entitled METHOD FOR FORMING A VACUUM INSULATED STRUCTURE, now U.S. Pat. No. 10,906,231, which is a national stage of PCT/US2016/054639 filed Sep. 30, 2016, entitled METHOD FOR FORMING A VACUUM INSULATED STRUCTURE, the entire disclosures of which are hereby incorporated herein by reference.

FIELD OF THE DEVICE

The device is in the field of vacuum insulated structures for appliances, more specifically, a method for expanding a structural envelope using an expanding device for limiting vacuum bow during generation of the internal vacuum of the vacuum insulated structure.

SUMMARY

In at least one aspect, a method of forming a vacuum insulated structure includes providing a plurality of outer walls attached together to define a structural envelope, the structural envelope having an insulation port and a vacuum port in communication with an insulating cavity defined within the structural envelope. An expanding device is attached to two opposing outer walls of the structural envelope. The interior cavity of the structural envelope is expanded by pulling the two opposing outer walls of the structural envelope away from one another to define an expanded state of the structural envelope, the expanded state defining an expanded interior volume. An insulating material is disposed within the insulating cavity via the insulation port, wherein the insulating material occupies substantially all of the insulating cavity in the expanded state. The insulation port is closed and sealed. Gas is expressed from the insulating cavity via the vacuum port, wherein the expression of gas at least partially collapses the structural envelope to a final state of the structural envelope, the final state of the envelope defining a final interior volume, the final interior volume being less than the expanded interior volume, and wherein the final state of the structural envelope defines a densified state of the insulating material within the insulating cavity. The vacuum port is closed to hermetically seal the insulating cavity.

In at least another aspect, a method of forming a vacuum insulated structure includes attaching an inner liner to an outer wrapper to define a structural cabinet, the outer wrapper defining a plurality of outer surfaces of the structural cabinet and the inner liner defining a plurality of inner compartment surfaces of the structural cabinet. An expanding device is attached to a plurality of outer surfaces and a plurality of inner compartment surfaces of the structural cabinet. The interior cavity of the structural cabinet is expanded by pulling the outer surfaces away from the inner compartment surfaces and also pulling the inner compartment surfaces away from the outer surfaces to define an expanded interior volume of the structural cabinet. An insulating material is disposed within the expanded interior volume of the insulating cavity, wherein the insulating material occupies substantially all of the expanded interior volume. Gas is expressed from the insulating cavity via a vacuum port of the structural cabinet, wherein the expression of gas at least partially draws the outer surfaces toward the inner compartment surfaces and partially draws the inner compartment surfaces toward the outer surfaces to define a final state of the structural cabinet. The final state is defined by a contracted interior volume that is less than the expanded interior volume and corresponds to a densified state of the insulating material within the insulating cavity. The vacuum port is closed to hermetically seal the insulating cavity.

In at least another aspect, a method of forming a vacuum insulated panel includes forming a structural envelope having opposing outer walls and a perimetrical edge extending between the opposing outer walls, the opposing outer walls and the perimetrical edge cooperating to define an interior insulating cavity. The structural envelope is placed into a retaining structure that engages the structural envelope proximate the perimetrical edge. An expanding device is attached to the two opposing outer walls of the structural envelope. The interior insulating cavity of the structural envelope is expanded by pulling the two opposing outer walls of the structural envelope away from one another to define an expanded interior volume of the interior insulating cavity. An insulating material is disposed within the interior insulating cavity, wherein the insulating material occupies substantially all of the expanded interior volume of the interior insulating cavity. Gas is expressed from the interior insulating cavity via a gas port of the structural envelope, wherein the expression of gas at least partially draws the opposing outer walls toward one another to define a final state of the structural envelope, the final state defined by a contracted interior insulating volume that is less than the expanded interior volume, the final state also corresponding to a densified state of the insulating material within the insulating cavity. The gas port is closed to hermetically seal the interior insulating cavity.

These and other features, advantages, and objects of the present device will be further understood and appreciated by those skilled in the art upon studying the following specification, claims, and appended drawings.

BRIEF DESCRIPTION OF THE DRAWINGS

In the drawings:

FIG. 18 is a schematic flow diagram illustrating a method for forming a vacuum insulated panel.

DETAILED DESCRIPTION OF EMBODIMENTS

Figure 1:
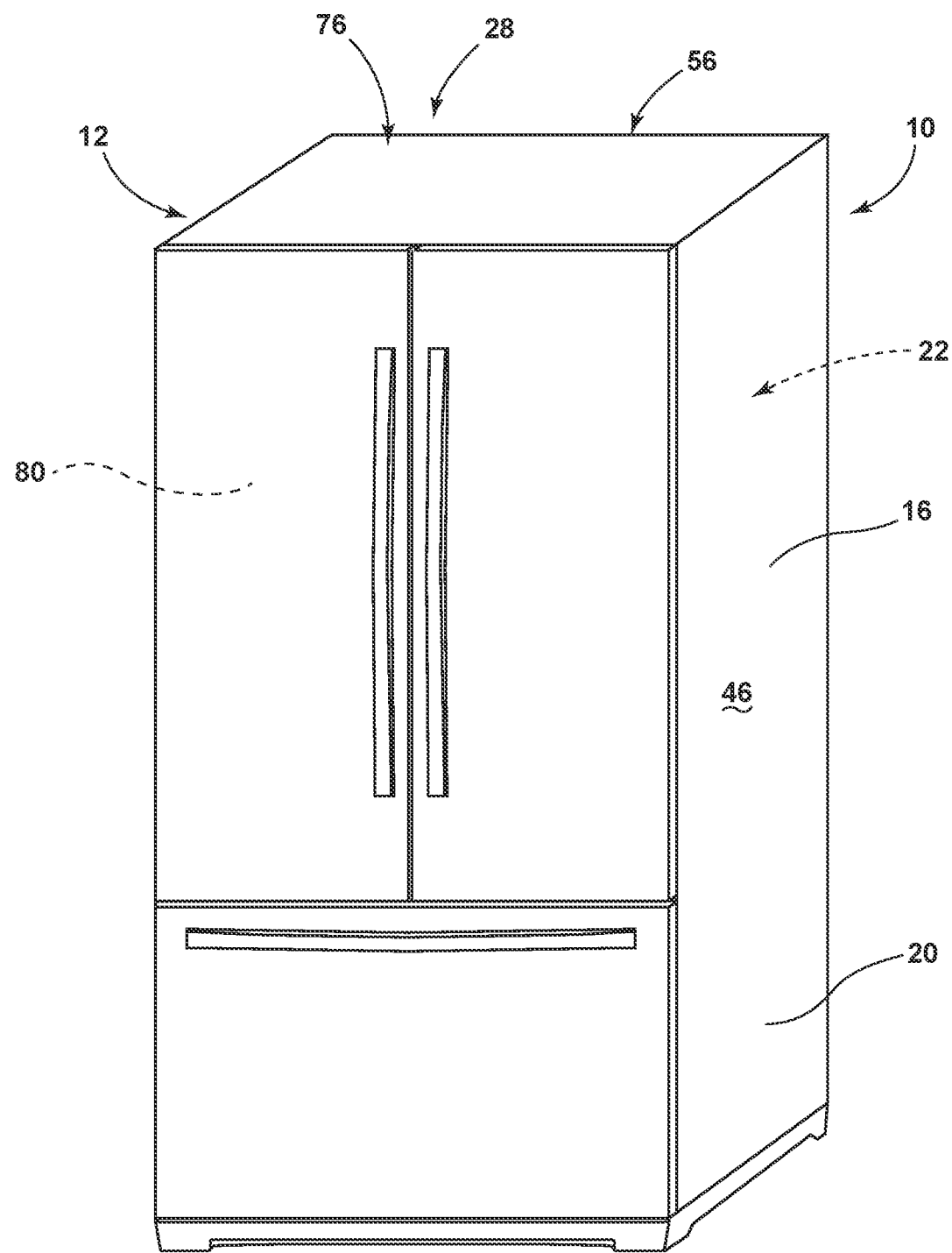
FIG. 1 is a front perspective view of a refrigerating appliance formed using aspects of the method for forming a vacuum insulated structure using an expanding device.
Figure 2:
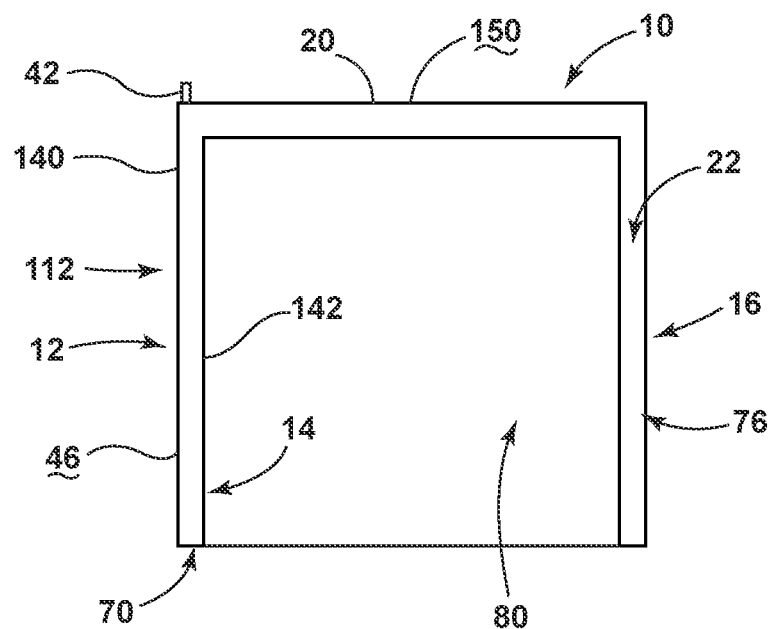
FIG. 2 is a cross-sectional view of a refrigerating cabinet before application of the expanding device.
Figure 3:
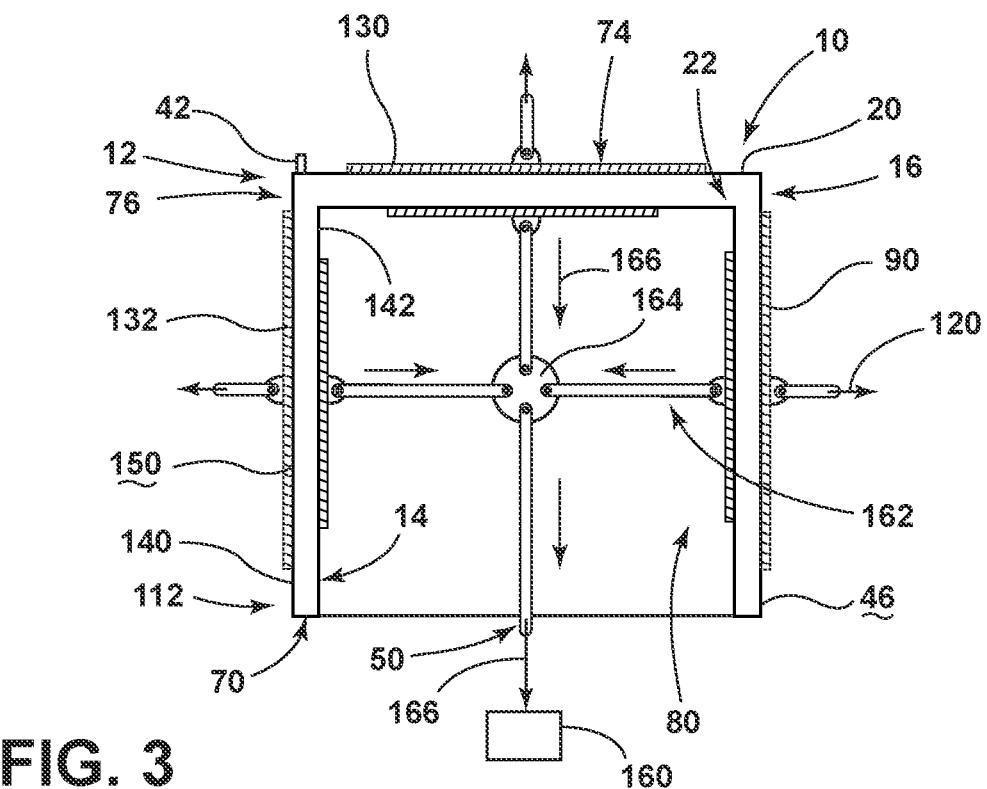
FIG. 3 is a cross-sectional view of the refrigerated cabinet of FIG. 2 showing the expanding device coupled to the inner liner and outer wrapper of the refrigerator cabinet.
Figure 4:
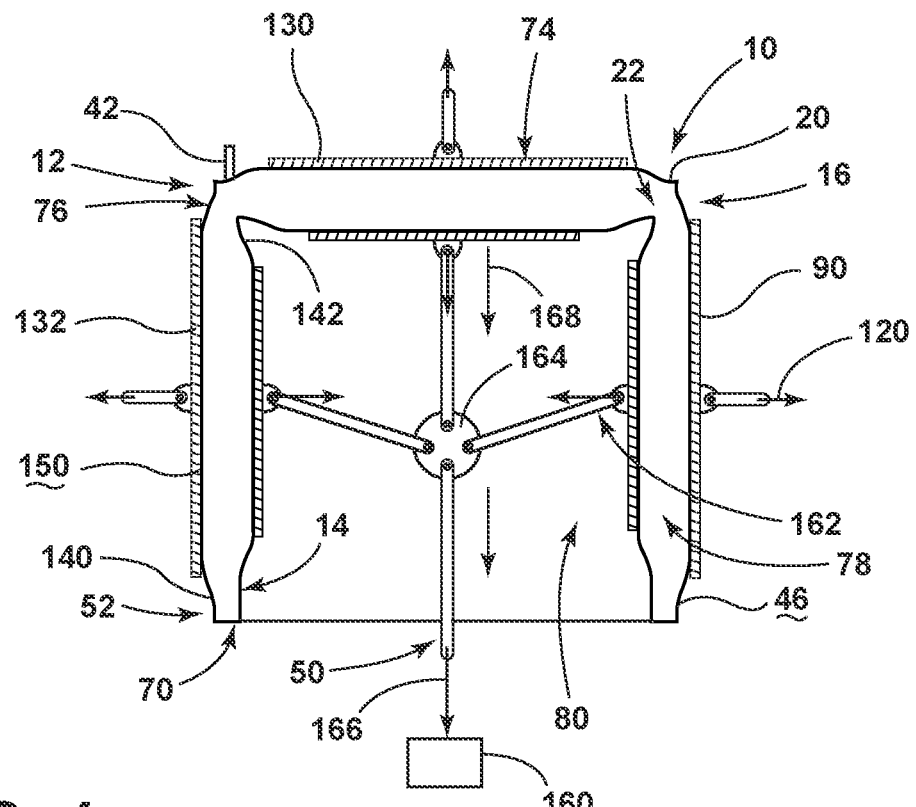
FIG. 4 is a cross-sectional view of the structural cabinet of FIG. 3 showing the expanding device operating to define an expanded state of an insulating cavity.
Figure 5:
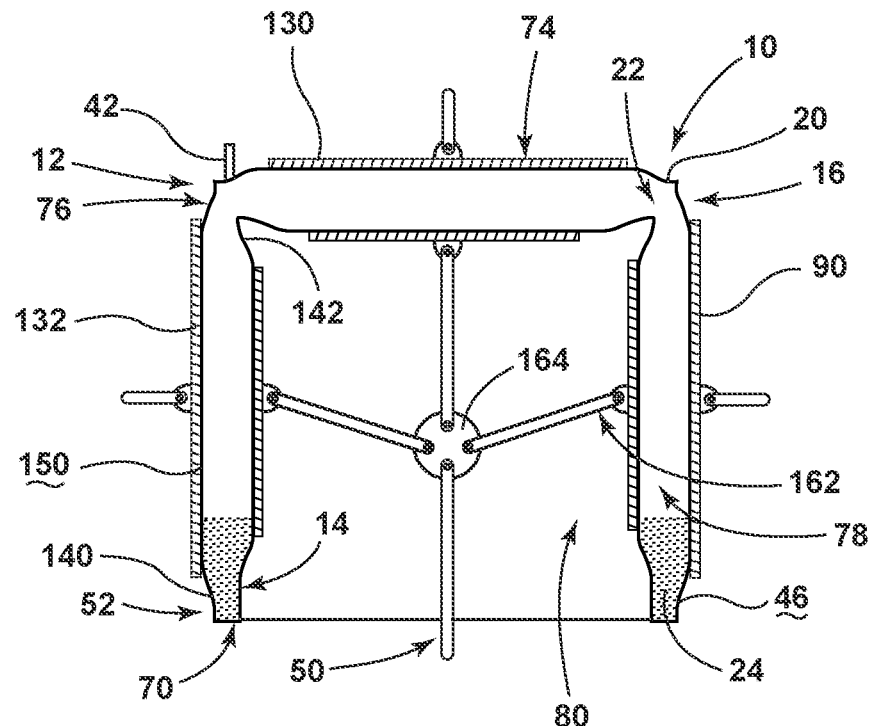
FIG. 5 is a cross-sectional view of the structural cabinet of FIG. 4 showing an insulating material being disposed within the structural cabinet.
Figure 6:
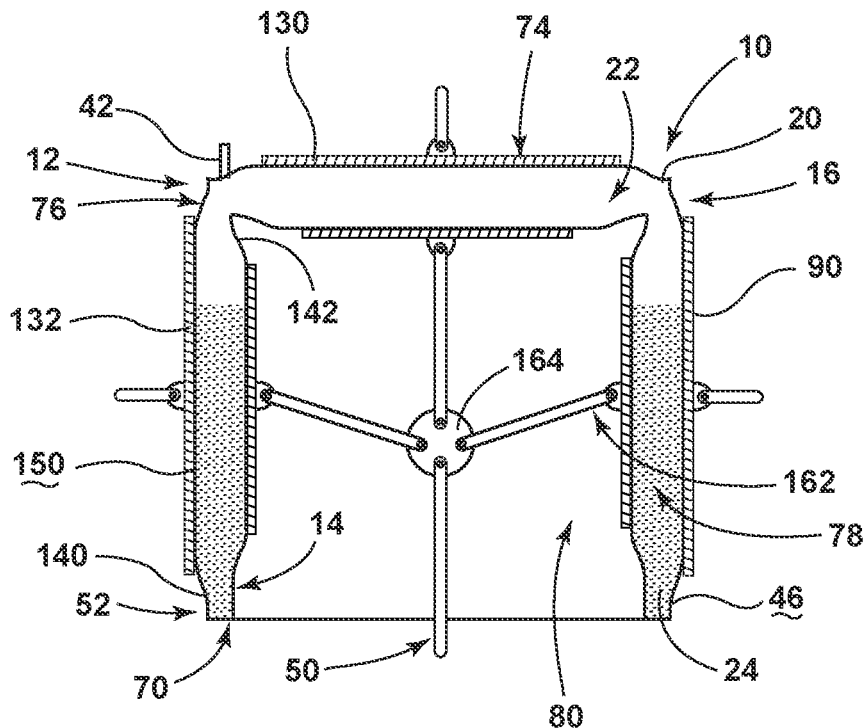
FIG. 6 is a cross-sectional view of the structural cabinet of FIG. 5 showing further disposal of the insulating material within the structural cabinet.
Figure 7:
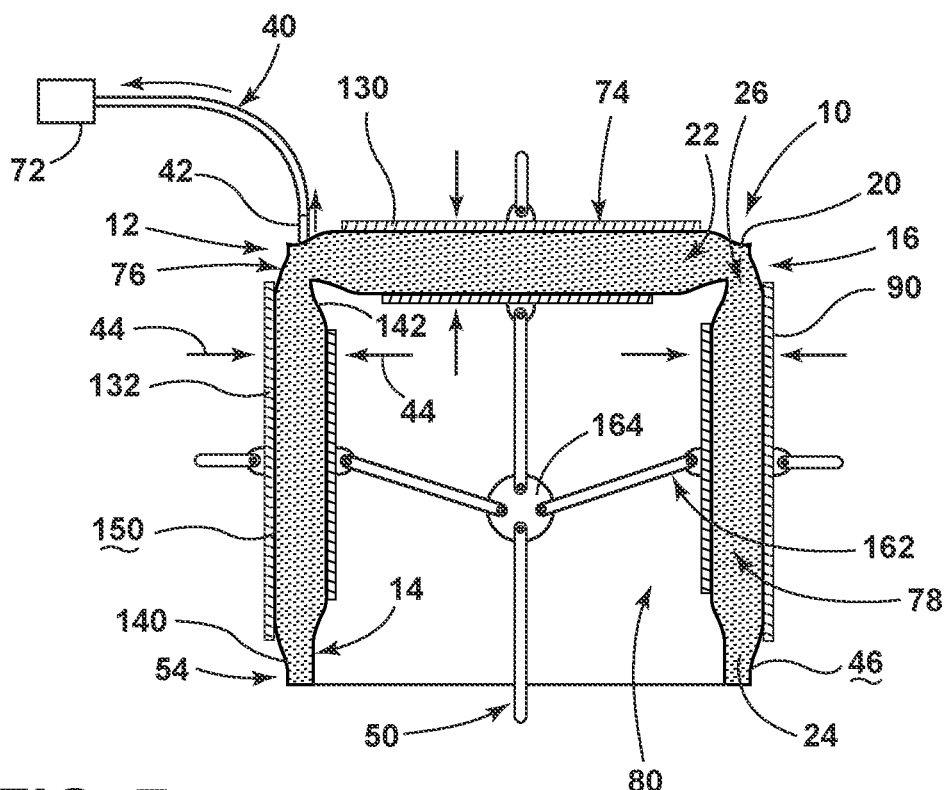
FIG. 7 is a cross-sectional view of the structural cabinet of FIG. 6 showing the insulating cavity in the expanded state being completely filled within the insulating material.
Figure 8:
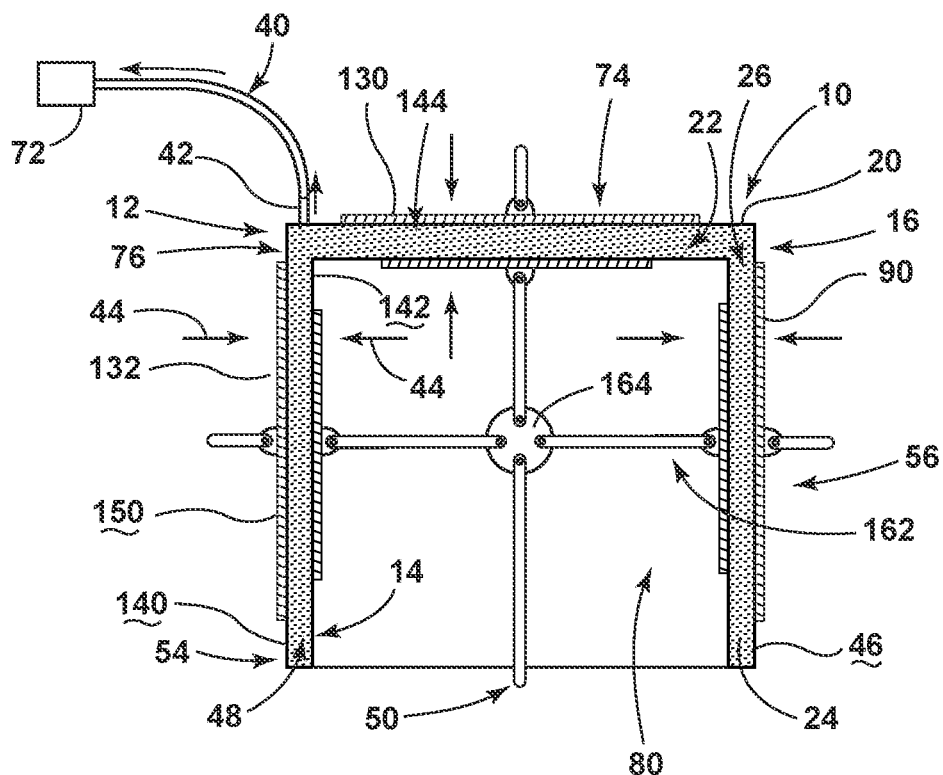
FIG. 8 is a cross-sectional view of the structural cabinet of FIG. 7 showing the structural cabinet after gas has been expressed from the structural cabinet and showing the structural cabinet in the final state.
Figure 9:
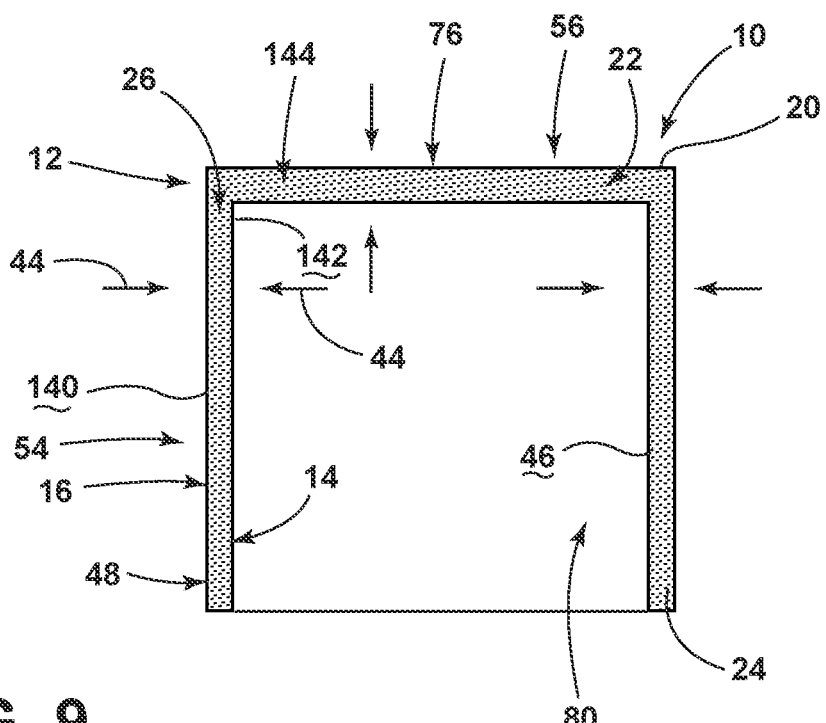
FIG. 9 is a cross-sectional view of the structural cabinet of FIG. 8, showing the expanding device removed after the structural cabinet is placed in the final state.
Figure 10:
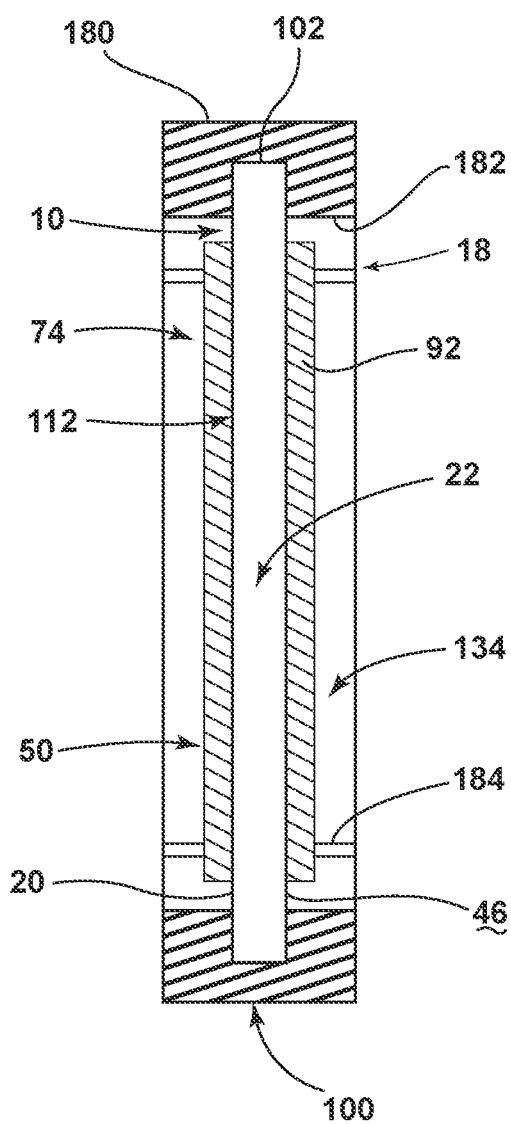
FIG. 10 is a cross-sectional view of a structural panel showing an aspect of the expanding device attached thereto.
Figure 11:
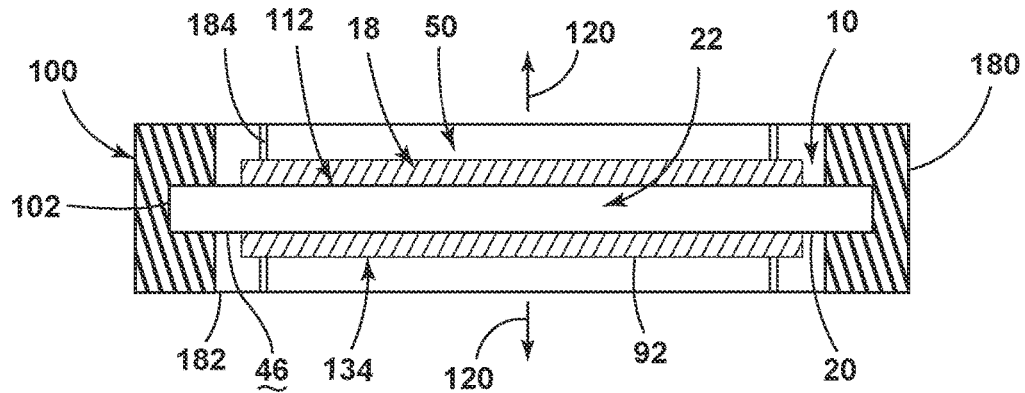
FIG. 11 is a cross-sectional view of the structural panel of FIG. 10 showing the expanding device moving outward to define the expanded state of the insulating cavity.
Figure 12:
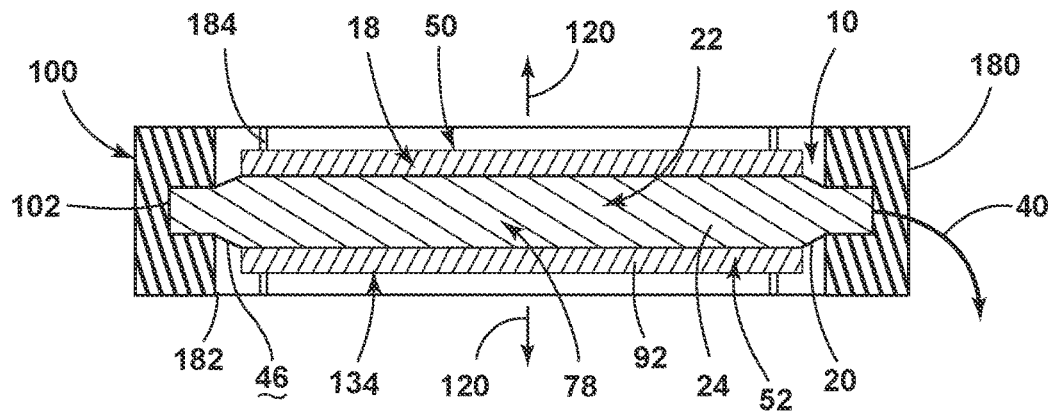
FIG. 12 is a cross-sectional view of the structural panel of FIG. 11 showing the structural panel in the expanded state and an insulating material disposed within the insulating cavity.
Figure 13:
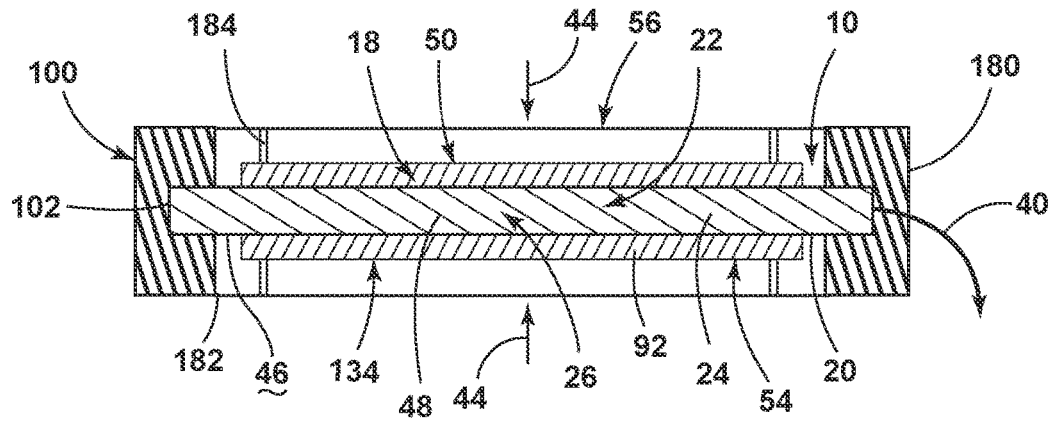
FIG. 13 is a cross-sectional view of the structural panel of FIG. 12 showing the expression of gas from the insulating cavity to define the final state of the structural panel.
Figure 14:
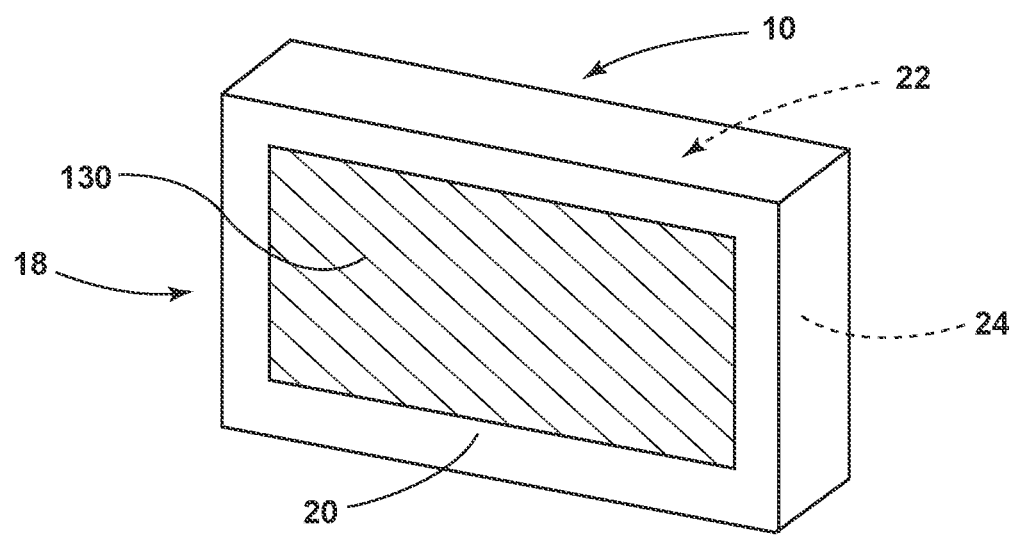
FIG. 14 is a schematic perspective view of a structural panel showing a location where the expanding device attaches to the exterior surface of the structural panel.
Figure 15:
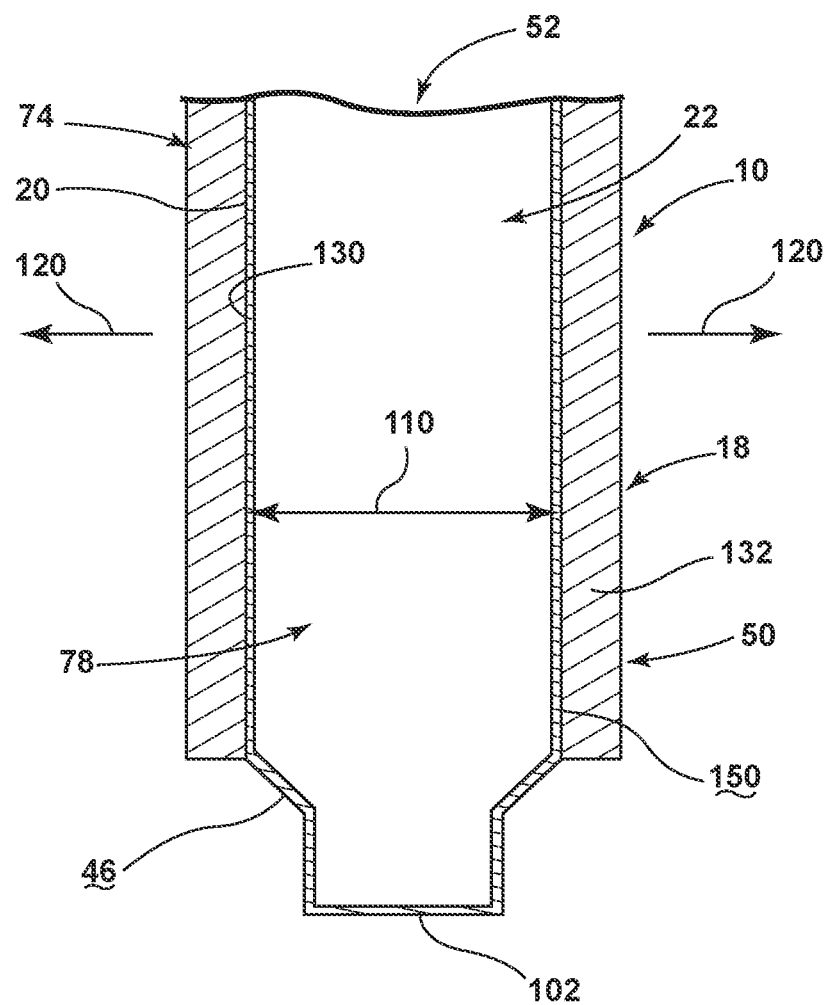
FIG. 15 is a schematic cross-sectional view of a structural panel showing an exemplary expansion of the structural panel into the expanded state.
Figure 16:
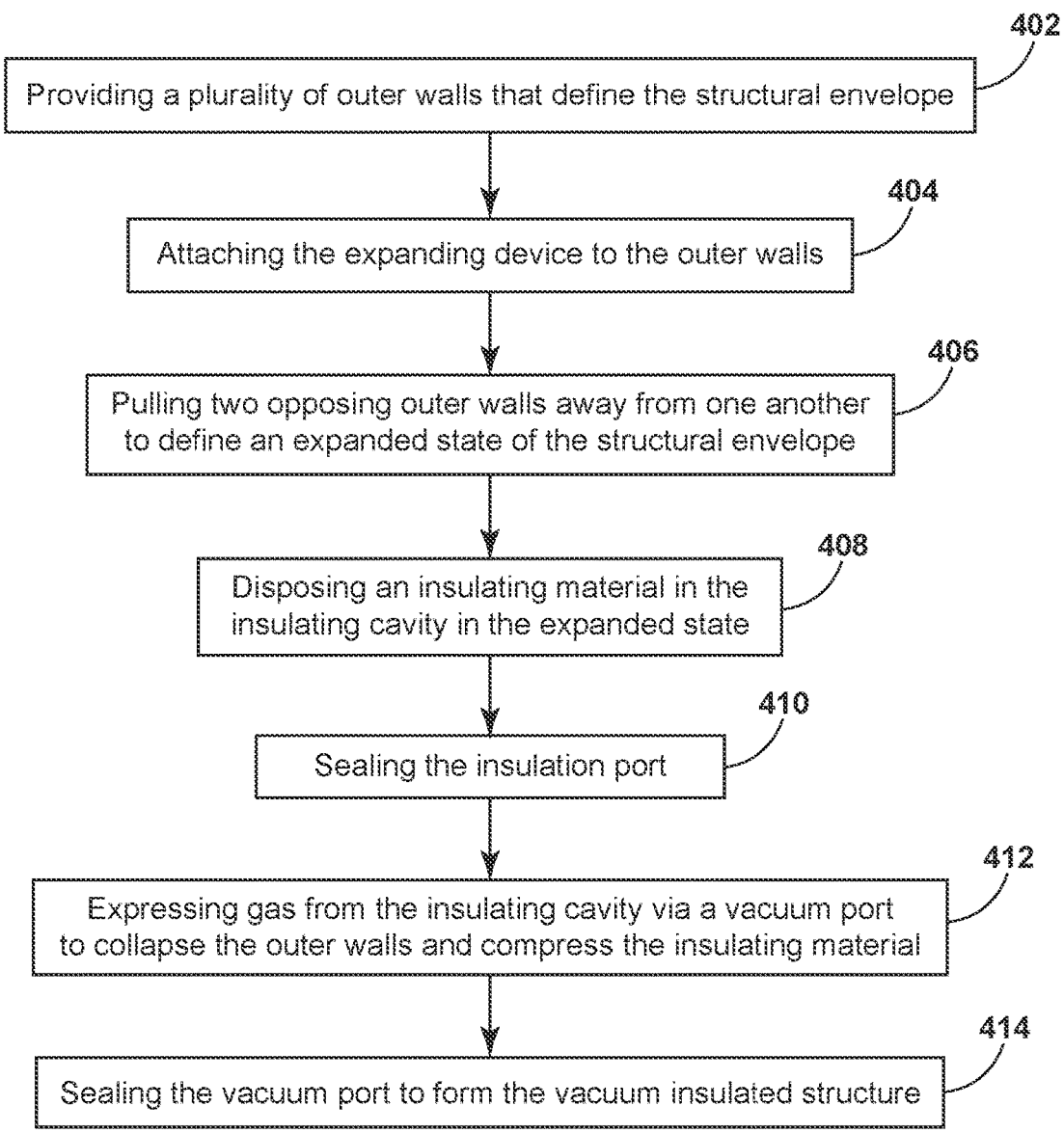
FIG. 16 is a schematic flow diagram illustrating a method for forming a vacuum insulated structure.
Figure 17:
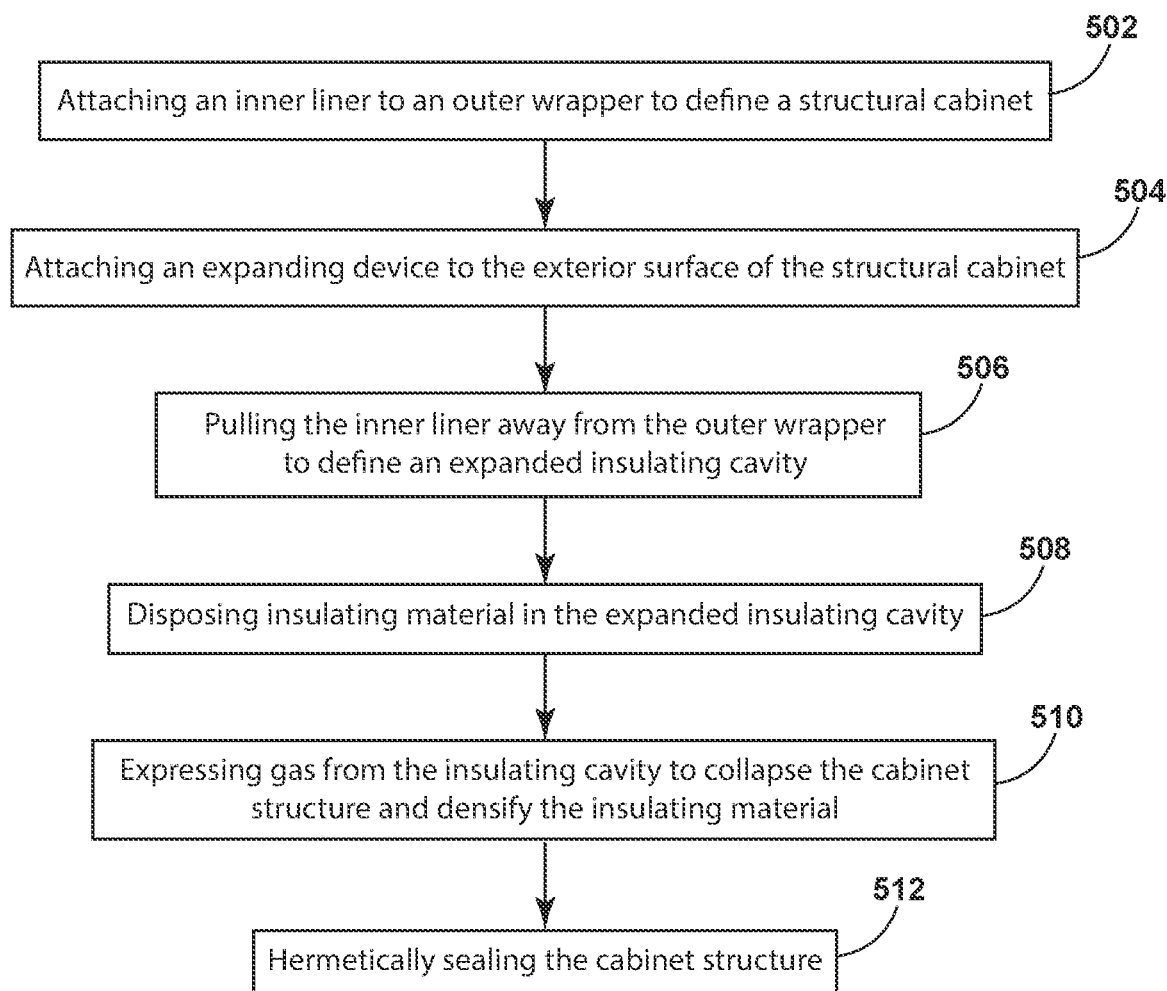
FIG. 17 is a schematic flow diagram illustrating a method for forming a vacuum insulated structure in the form of a structural cabinet.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-15, reference numeral 10 generally refers to a structural envelope that takes the form of a refrigerated cabinet 12 having an inner liner 14 and an outer wrapper 16. The structural envelope 10 can also take the form of a structural panel 18 having opposing outer walls 20. In each of these configurations, the structural envelope 10 includes a plurality of outer walls 20 that cooperate to define an interior insulating cavity 22 disposed therein. Inside this insulating cavity 22, an insulating material 24 can be disposed within, or the insulating cavity 22 can be placed under an at least partial vacuum 26. The at least partial vacuum 26, in conjunction with the insulating material 24, provides an insulating functionality for the structural envelope 10. This insulating functionality can be utilized in the formation of various appliances 28. Such appliances 28 can include, but are not limited to, refrigerators, freezers, coolers, ovens, laundry appliances, dishwashers, and other various appliances 28 that can be placed in residential and/or commercial settings.

Referring again to FIGS. 1-15, in forming the at least partial vacuum 26 within the insulating cavity 22 of the structural envelope 10, gas 40 is expressed from the insulating cavity 22 through one or more vacuum ports 42 defined within one or more of the outer walls 20 of the structural envelope 10. While the term "expressed" is used to refer to the removal of gas 40 from the insulating cavity 22, this term is meant to also refer to expulsion, compression, suction, extraction, combinations thereof and other similar methods of removing gas 40 from the insulating cavity 22 of the structural envelope 10. During this expression of gas 40, the air pressure within the insulating cavity 22 decreases in relation to the air pressure surrounding the structural envelope 10. This differential in air pressure between the exterior and the insulating cavity 22 can cause an inward pressure 44 being applied to the exterior surface 46 of the structural envelope 10. This inward pressure 44, under certain conditions, may result in an inward bowing of portions of the structural envelope 10. It is contemplated that the inward bowing of the structural envelope 10 can be counteracted through a compacted form or densified state 48 of the insulating material 24 that has a sufficient structure so as to resist the inward bowing of the structural envelope 10. The various methods and aspects of methods described herein serve to provide a system for generating a densified state 48 of the insulating material 24 within the insulating cavity 22. The aspects of the disclosed methods utilize an expanding device 50 attached to opposing outer walls 20 of the structural envelope 10 to expand the insulating cavity 22 to define an expanded state 52. Once in the expanded state 52, insulating material 24 can be disposed within the interior insulating cavity 22 while in the expanded state 52. Once filled with the insulating material 24, gas 40 is expressed from the insulating cavity 22 in the expanded state 52, thereby generating a pressure differential 54 with respect to the air pressure within the insulating cavity 22 and the atmospheric air pressure surrounding the exterior surface 46 of the structural envelope 10. This pressure differential 54 causes the inward pressure 44 being exerted against the outer walls 20 of the structural envelope 10 to collapse the outer walls 20 toward one another. This collapsing of the outer walls 20 causes a compression of the insulating material 24 disposed therein. This compression serves to compact and form the densified state 48 of the insulating material 24 making it more structurally robust to resist overdeflection of the outer walls 20 of the structural envelope 10. Gas 40 is expressed from the insulating cavity 22 until a final state 56 of the structural cabinet 12 is achieved, where the final state 56 defines a sufficiently densified insulating material 24 within the insulating cavity 22 of the structural envelope 10 of the final state 56. Disclosed herein are various methods and aspects thereof which serve to generate this final state 56 of the structural envelope 10 with a sufficiently densified form of the insulating material 24 disposed therein.

Referring now to FIGS. 1-16, a method 500 is disclosed for forming a vacuum insulated structure utilizing the expanding device 50. According to the various embodiments, a plurality of outer walls 20 are provided and are attached together to define the structural envelope 10 (step 402). The structural envelope 10 can include an insulation port 70 and a vacuum port 42 that are in communication with the insulating cavity 22 defined within the structural envelope 10. It is contemplated that the insulation port 70 can be a specifically defined opening or plurality of openings through which the insulating material 24 can be disposed within the insulating cavity 22 of the structural envelope 10. It is also contemplated that the insulation port 70 can be an unsealed or unconnected edge of the insulating cavity 22 through which the insulating material 24 can be poured or otherwise disposed within the insulating cavity 22. The vacuum port 42 is typically a nozzle, conduit, or other structure through which a vacuum pump 72 or other suction device can be attached for the expression of gas 40 within the insulating cavity 22, as will be described more fully below. Once the structural envelope 10 is formed, an attaching position of the expanding device 50 is attached to two opposing outer walls 20 of the structural envelope 10 (step 404).

Referring again to FIGS. 1-16, the structural envelope 10 can include a single structural member, in the form of a structural panel 18. Alternatively, the structural envelope 10 can include a plurality of walls 76, such as in the form of a structural cabinet 12 for an appliance 28. The opposing outer walls 20 of the structural envelope 10, to which the expanding device 50 attaches, are defined as opposing outer walls 20 of each structural wall 76 of the structural envelope 10. Stated another way, each side wall, top wall, back wall and bottom wall of the structural envelope 10 includes opposing outer walls 20. The expanding device 50 attaches to each of these opposing outer walls 20 for each structural wall 76 of the structural envelope 10. In this manner, each structural wall 76 can be manipulated through use of the expanding device 50 to expand each structural wall 76 by pulling the opposing outer walls 20 away from each other.

Referring again to FIGS. 1-6, once the expanding device 50 is attached to the opposing outer walls 20, the interior cavity of the structural envelope 10 is expanded by pulling the two opposing outer walls 20 of the structural envelope 10 away from one another to define an expanded state 52 of the structural envelope 10 (step 406). The expanded state 52 of the structural envelope 10 defines an expanded interior volume 78. As discussed above, the expanding device 50 is attached to each of the opposing outer walls 20 and pulls the opposing outer walls 20 in opposite directions. In the case of a structural cabinet 12, one of the opposing outer walls 20 is pulled away from a refrigerating compartment 80 of the other of the opposing outer walls 20 are pulled inward and into the refrigerating compartment 80. This expansion serves to increase the interior volume of the insulating cavity 22 to define the expanded interior volume 78. Once in the expanded state 52, an insulating material 24 is disposed within the insulating cavity 22 via the insulation port 70 (step 408). It is contemplated that the insulating material 24 can occupy substantially all of the insulating cavity 22 in the expanded state 52.

Referring again to FIGS. 1-16, once the insulating material 24 occupies all or substantially all of the expanded interior volume 78 of the insulating cavity 22, the insulation port 70 is closed and sealed to define, or substantially define, a hermetic seal (step 410). A hermetic seal at the insulation port 70 is necessary to prevent the leaking of gas 40 therethrough during subsequent steps of expressing gas 40. Gas 40 is then expressed from the insulating cavity 22 via the vacuum port 42 (step 412).

According to the various embodiments, the expression of gas 40 results in the inward pressure 44 and at least partially collapses the structural envelope 10 and draws the opposing outer walls 20 closer together to define a final state 56 of the structural envelope 10. This collapsing of the opposing outer walls 20 serves to compress the insulating material 24 disposed therein into the densified state 48. The densified state 48 of the insulating material 24 is more structurally robust such that the densified insulating material 24 can better resist the inward bowing of the opposing outer walls 20 of the structural envelope 10 caused by the pressure differential 54. The densified insulating material 24 can resist the inward compressive forces generated by the pressure differential 54 between the at least partial vacuum 26 within the insulating cavity 22 and the atmospheric pressure surrounding the structural envelope 10. The final state 56 of the structural envelope 10 defines a final interior volume, where the final interior volume is less than the expanded interior volume 78. Once the final state 56 of the structural envelope 10 is reached, the vacuum port 42 is closed and hermetically sealed to maintain the at least partial vacuum 26 within the insulating cavity 22 (step 414).

Referring again to FIGS. 1-15, it is contemplated that the plurality of outer walls 20 can be made of a metallic and magnetic material. In such an embodiment, it is contemplated that the expanding device 50 attaches to each of the outer walls 20 via a magnetic attachment mechanism 90. Typically, metallic outer walls 20 of the structural envelope 10 will be used in a structural cabinet 12 of an appliance 28. In such a structural cabinet 12, the structural cabinet 12 can include a plurality of structural walls 76 that are defined by an inner liner 14 and an outer wrapper 16. It is contemplated that the inner liner 14 and outer wrapper 16 can each be metallic. It is also contemplated that the inner liner 14 and outer wrapper 16 can be made of different materials. In such an embodiment, the outer wrapper 16 may be made of metal and the inner liner 14 may be made of a plastic or polymer-type material. Where different materials are used between the inner liner 14 and outer wrapper 16, it is contemplated that the expanding device 50 can include different attaching portions 130 for attaching to the different materials. It is contemplated that the expanding device 50, in the case of a structural cabinet 12, attaches to the inner liner 14 and outer wrapper 16 of each structural wall 76 of the structural cabinet 12. Where the inner liner 14 is made of plastic, the attaching device 74 of the expanding device 50 may define a vacuum pad 92 that utilizes suction to maintain engagement with a corresponding outer wall 20 of the inner liner 14. It is contemplated that a vacuum pad 92 may also be utilized where the structural envelope 10 is a structural panel 18, such as in the form of a vacuum insulated panel.

Referring now to FIGS. 10-14, where the structural envelope 10 is a structural panel 18, the expanding device 50 serves to stretch the opposing outer walls 20 of the planar structural panel 18 away from one another. In order to substantially retain the overall shape of the structural panel 18, the expanding device 50 can include a retaining mechanism 100 that attaches to and maintains a position of a perimeter edge 102 of the planar structural panel 18. Accordingly, during operation of the expanding device 50, the opposing outer walls 20 are stretched away from one another, but the overall shape of the perimeter edge 102 is maintained such that the general perimetrical size of the structural panel 18 is maintained throughout the process for forming the final state 56 of the structural envelope 10.

Referring again to FIGS. 2-15, it is contemplated that the expanded state 52 of the structural envelope 10 defines an expanded wall thickness 110 that is greater than that of the preformed state 112 of the structural envelope 10. The preformed state 112 of the structural envelope 10 is typically defined as the shape of the structural envelope 10 when assembled to define a hollow insulating cavity 22 and before the expanding device 50 is attached thereto. During operation of the expanding device 50, it is contemplated that the expanded wall thickness 110 of the structural envelope 10 in the expanded state 52 can be within a range that is from approximately 2 millimeters to approximately 6 millimeters thicker than the thickness of the structural wall 76 of the structural envelope 10 in the preformed and/or final states 112, 56.

According to the various embodiments, during operation of the expanding device 50, it is contemplated that each of the outer walls 20 can be deformed away from the opposing outer wall 20 to define the expanded state 52. This opposing and outward movement 120 of the opposing outer walls 20 can be defined by a deflection of the opposing outer walls 20, a stretching of the opposing outer walls 20, an outward deformation of the opposing outer walls 20, or other similar outward expanding movement that can serve to define the expanded state 52 of the structural envelope 10. It is contemplated that the expanded state 52 of the structural envelope 10 can be counteracted through the expression of gas 40 from the insulating cavity 22. This expiration of gas 40 from the insulating cavity 22 serves to counteract the opposing outward movement 120 generated by the expanding device 50 and serves to reconstitute the structural envelope 10 into the final state 56, which may have a shape substantially similar to that of the preformed state 112. As discussed above, this expression of gas 40 to inwardly deflect the opposing outer walls 20 serves to compress and define a densified state 48 of the insulating material 24 within the insulating cavity 22.

Referring again to FIGS. 2-14, it is contemplated that the expanding device 50 can include a plurality of attaching portions 130 that selectively engage the outer walls 20 of the structural envelope 10. It is contemplated that each attaching portion 130 of the expanding device 50 includes an attachment pad 132 that engages at least half of the exterior surface 46 of the corresponding outer wall 20. As discussed above, the attachment pad 132 and the expanding device 50 can be in the form of a magnetic attachment mechanism 90, a vacuum-type attachment mechanism 134, or other similar attachment mechanism. The use of magnets and vacuums allows for a surface-to-surface engagement of the attachment pads 132 with the outer walls 20 of the structural cabinet 12. This also serves to increase the amount of surface area that can be engaged by the attachment pad 132 during use of the expanding device 50. The greater surface area occupied by each of the attachment pads 132 provides for a greater amount of deflection to define a greater expanded interior volume 78 that defines the expanded state 52 of the structural envelope 10. It is also contemplated that instead of a surface-to-surface connection, the attachment pad 132 can attach to various hooks, cleats, and other mechanical-type engagements that can be used to expand the opposing outer walls 20 outward to define the expanded state 52 of the structural envelope 10.

According to various embodiments, it is contemplated that the step of expressing gas 40 is typically performed through a vacuum pump 72 that draws air through the vacuum port 42. It is also contemplated that the step of expressing gas 40 can at least partially be performed by the expanding device 50 operating in an opposite direction to apply a compressive force to the opposing outer walls 20 of the structural envelope 10 that serves to compress the structural envelope 10 to define the final state 56.

Referring again to FIGS. 1-15 and 17, a method 500 is disclosed for forming a vacuum insulated structure in the form of a structural cabinet 12. According to the method 500, an inner liner 14 is attached to an outer wrapper 16 to define the structural cabinet 12 (step 502). The outer wrapper 16 defines a plurality of outer surfaces 140 of the structural cabinet 12 and the inner liner 14 defines a plurality of inner compartment surfaces 142 of the structural cabinet 12. The expanding device 50 is attached to the exterior surface 46 of the structural cabinet 12 and more specifically to the plurality of outer surfaces 140 of the outer wrapper 16 and the plurality of inner compartment surfaces 142 of the inner liner 14 of the structural cabinet 12 (step 504). The interior cavity of the structural cabinet 12 is expanded by pulling the outer surfaces 140 away from the inner compartment surfaces 142 and also by pulling the inner compartment surfaces 142 away from the outer surfaces 140 to define an expanded interior volume 78 of the structural cabinet 12 (step 506). Once the expanded interior volume 78 is defined, the insulating material 24 is disposed within the expanded interior volume 78 of the insulating cavity 22 (step 508). As discussed above, it is contemplated that the insulating material 24 is disposed within the insulating cavity 22 to occupy all or substantially all of the expanded interior volume 78. Gas 40 from the insulating cavity 22 can then be expressed via a vacuum port 42 of the structural cabinet 12 (step 510). It is contemplated that the expression of gas 40 at least partially draws the outer surfaces 140 toward the inner compartment surfaces 142 and partially draws the inner compartment surfaces 142 toward the outer surfaces 140 to define a final state 56 of the structural cabinet 12. This final state 56 is defined by a contracted interior volume 144 that is less than the expanded interior volume 78. This contracted interior volume 144 of the structural cabinet 12 corresponds to a densified state 48 of the insulating material 24 within the insulating cavity 22. Once the densified state 48 of the insulating material 24 is defined such that the insulating material 24 is structurally robust enough to withstand inward pressure 44 and inward bowing forces caused by the pressure differential 54, the vacuum port 42 is closed and hermetically sealed (step 512). By hermetically sealing the vacuum port 42, the at least partial vacuum 26 is maintained within the insulating cavity 22.

Referring again to FIGS. 2-15, it is contemplated that the expanding device 50 includes a plurality of pulling or attachment pads 132 that engage the outer surfaces 140 of the outer wrapper 16 and the inner compartment surfaces 142 of the inner liner 14, respectively. Each attachment pad 132 is adapted to cover at least 50 percent of an expandable surface 150 to which the respective attachment pad 132 attaches. It is contemplated that each expandable surface 150 is one of the outer surfaces 140 and the inner compartment surfaces 142, such that each attachment pad 132 attaches to one expandable surface 150. Accordingly, the expandable surfaces 150 of expanding outer walls 20 of the inner liner 14 and outer wrapper 16 can be pulled away from one another during operation of the expanding device 50 to define the expanded state 52 of the structural cabinet 12.

Referring again to FIGS. 2-9, it is contemplated that the outer wrapper 16 can be a metallic member and the attachment pads 132 or pulling pads that engage the expandable surface 150 of the outer surfaces 140 of the structural cabinet 12 can include a magnetic attachment mechanism 90. This magnetic attachment mechanism 90 can be in the form of an electromagnet that is operable to selectively define a magnetic field that attaches to one of the outer surfaces 140 of the outer wrapper 16. In such an embodiment, each attachment pad 132 that attaches to the various outer surfaces 140 of the structural cabinet 12 can each define a separate electromagnet that attaches to the outer wrapper 16. As discussed above, it is contemplated that each of the outer wrapper 16 and inner liner 14 can be made of a metal material that is also magnetic. In such an embodiment, each of the attachment pads 132 of the expanding mechanism includes a magnetic attachment mechanism 90.

Referring again to FIGS. 2-9, it is contemplated that the inner liner 14 can be a plastic member and the pulling pads or attachment pads 132 of the expanding mechanism that engage the inner compartment surfaces 142 of the inner liner 14 include a suction-type or a vacuum-type attachment mechanism 134. This vacuum-type attachment mechanism 134 can be in communication with a vacuum pump 72 that draws air from a region between the inner compartment surface 142 and the attachment pad 132 to create the suction that maintains engagement between the attachment pad 132 and the inner compartment surfaces 142. It is also contemplated that the attachment pad 132 can be a suction cup, where the suction cup is manipulated to compress against the inner compartment surface 142 to create a vacuum through the mere deformation of the suction cup. In such an embodiment, a vacuum pump 72 may not be necessary to maintain the attachment between the attachment pads 132 and the inner compartment surfaces 142.

It is contemplated that in various embodiments, both the inner liner 14 and outer wrapper 16 can be made of a plastic material, such that vacuum-type attachment mechanism 134 is used for both the outer surfaces 140 of the outer wrapper 16 and the inner compartment surfaces 142 of the inner liner 14 to create the expanded state 52 of the structural cabinet 12. It is also contemplated that the outer wrapper 16 can be metallic and the inner liner 14 can be a plastic-type material, such that the attachment pads 132 that engage the outer surfaces 140 of the outer wrapper 16 can be of a different type (magnetic) than the attachment pads 132 that attach to the inner compartment surfaces 142 of the inner liner 14 (vacuum). It is also contemplated that where different materials or different types of materials are included in the inner liner 14 and outer wrapper 16, different amounts of force may be applied by the expanding device 50 to generate the desired amount of outward expansion of the inner liner 14 and outer wrapper 16 to define the expanded state 52 of the structural cabinet 12. By way of example, and not limitation, where the outer wrapper 16 is metal and the inner liner 14 is plastic, a greater amount of pulling force 166 may be required to draw the outer surfaces 140 of the outer wrapper 16 away from the inner liner 14 than to expand the inner liner 14.

According to the various embodiments, it is also contemplated that the inclusion of different materials within the inner liner 14 and outer wrapper 16 can dictate a different amount of expansion to define the expanded state 52. These differing amounts of expansion can be useful during the expression of gas 40 such that the expression of gas 40 may cause a greater inward movement of one material rather than another. By way of example, and not limitation, the expression of gas 40 may cause a greater inward deflection of the polymer inner liner 14 than that of a metallic outer wrapper 16. Accordingly, greater deflection of the plastic inner liner 14 may be achieved through expanding device 50 as opposed to the expansion of the outer wrapper 16. One of the goals of the use of the expanding device 50 is to create a system that will result in the final state 56 of the structural cabinet 12 or structural envelope 10 after the expression of gas 40. Accordingly, the amount of expansion of each material can be calculated before the use of the expanding device 50 such that precise movements can be predicted during the expression of gas 40 to form the final state 56 of the structural envelope 10.

Referring again to FIGS. 3-8, it is contemplated that the attachment pads 132 that engage to the inner compartment surfaces 142 of the inner liner 14 can be attached to a pulling device 160 and a linkage mechanism 162 that attaches all of the interior attachment pads 132 to a single coupler 164. This coupler 164 attaches to each linkage mechanism 162 to translate a single pulling force 166 of the pulling device 160. This single pulling force 166, which is exerted in a first direction can be translated into a plurality of subsidiary pulling forces 168 that can be exerted to pull each of the inner compartment surfaces 142 in a generally perpendicular direction with respect to a respective opposing outer surface 140 of the outer wrapper 16. Accordingly, the single pulling force 166 of the pulling device 160 is exerted in a direction away from the interior compartment. The coupler 164 translates the single pulling force 166 to each of the attachment pads 132 that engage the inner liner 14. As the pulling force 166 is exerted, each subsidiary pulling force 168 is exerted in a direction that is substantially normal to each respective inner compartment surface 142. It is contemplated that various linkage members can also attach to the outer surfaces 140 of the outer wrapper 16 to minimize the number of pulling forces 166 necessary to define the expanded state 52 of the structural cabinet 12.

Referring now to FIGS. 1-15 and 18, a method 600 is disclosed for forming a vacuum insulated panel, the method 600 including a step 602 of forming a structural envelope 10 in the form of a structural panel 18 having opposing outer walls 20 and a perimetrical edge extending between the opposing outer walls 20. It is contemplated that the opposing outer walls 20 and the perimetrical edge cooperate to define an interior insulating cavity 22. The structural panel 18 is placed into the retaining structure and engages the structural panel 18 proximate to the perimetrical edge (step 604). The expanding device 50 is then attached to the two opposing outer walls 20 of the structural panel 18 (step 606). As discussed above, the expanding device 50 attaches to the expandable surface 150 of each opposing outer wall 20. The interior insulating cavity 22 of the structural panel 18 is then expanded (step 608). This expansion can be achieved by pulling the two opposing outer walls 20 of the structural envelope 10 away from one another to define the expanded interior volume 78 of the interior insulating cavity 22. An insulating material 24 is then disposed within the interior insulating cavity 22 (step 610). As discussed above, the insulating material 24 serves to occupy all or substantially all of the expanded interior volume 78 of the interior insulating cavity 22. Gas 40 can then be expressed from the interior insulating cavity 22 via a gas port of the structural envelope 10 (step 612). The expression of gas 40 at least partially draws the opposing outer walls 20 towards one another to define a final state 56 of the structural panel 18. As discussed above, the expression of gas 40 can be generated through a vacuum pump 72 or can be generated through a compression exerted by the same mechanism that drew the opposing outer walls 20 outward. In this second embodiment, the expanding device 50 can be adapted to exert both outward and inward forces to define the expanded interior volume 78 and also the final contracted interior insulating volume of the structural panel 18. The final state 56 of the structural panel 18 is characterized by a contracted interior insulating volume that is less than the expanded interior volume 78. The final state 56 also corresponds to a densified state 48 of the insulating material 24 within the insulating cavity 22. The gas port is then closed and sealed (step 614). This seal is typically a hermetic seal to maintain the at least partial vacuum 26 within the interior insulating cavity 22 and maintain the shape of the final state 56 of the structural panel 18.

Referring again to FIGS. 10-14, it is contemplated that the step of expanding the interior insulating cavity 22, according to the various methods, includes the retaining mechanism 100 maintaining the position of the perimetrical edge as the opposing outer walls 20 are pulled away from one another by the expanding device 50. In such an embodiment, it is contemplated that the retaining mechanism 100 is a frame 180 that extends around the entire perimetrical edge of the structural panel 18 and maintains the position of the entire perimetrical edge. The frame 180 of the retaining mechanism 100 can define opposing apertures 182 through which the opposing outer walls 20 of the structural panel 18 are accessible to attach to the attachment pads 132 of the expanding device 50. As discussed above, the expanding pads can include various attachment mechanisms that can include, but are not limited, magnetic attachment mechanisms 90, suction-type attachment mechanisms, mechanical attachment mechanisms, adhesives, combinations thereof, and other similar attachment mechanisms.

Referring again to FIGS. 10-14, it is contemplated that the opposing apertures 182 of the frame 180 of the retaining mechanism 100 can define pad guides 184 through which the attachment pads 132 of the expanding device 50 can attach to the opposing outer walls 20. It is also contemplated that the pad guides 184 define a linear operation of the attachment pads 132 of the expanding device 50, such that the expansion of the structural panel 18 that defines the expanded interior volume 78 can be substantially consistent and linear in operation. As discussed above, the material of the structural panel 18 can vary depending upon the desired design. The opposing outer walls 20 can be made of a magnetic material, such as metal, or can be made of a polymer-type material such as plastic. It is also contemplated that the opposing outer walls 20, or each opposing outer wall 20 can be made of a variety of materials or combinations of materials that may or may not be magnetic. As discussed above, the attaching device 74 of the expanding device 50 can depend on the material of the opposing outer walls 20 of the structural envelope 10.

According to the various embodiments, the use of the expanding mechanism can serve to pre-expand the structural envelope 10 such that as gas 40 is expressed from the structural envelope 10, the phenomena of vacuum bow caused by the expression of gas 40 and the pressure differential 54 within the insulating cavity 22 and the atmosphere outside the structural envelope 10 can be used as an advantage to compress the insulating material 24 within the insulating cavity 22. The amount of insulating material 24 included in the insulating cavity 22, the material of the structural envelope 10, the amount of gas 40 expressed, the amount of deflection caused by the expanding device 50, and other factors can be used to design the structural envelope 10 and the insulating cavity 22 for forming the final state 56 of the structural envelope 10. The use of the vacuum bow phenomenon as an advantageous compressive force minimizes the amount of unwanted vacuum bow that can result in thinner portions of the structural envelope 10 that may have less insulating functionality. It is contemplated that use of the expanding mechanism and the compressive vacuum bow generated by the expression of gas 40 can create a substantially precise dimensioned vacuum insulated structure that can either form a structural cabinet 12 or can be used within a structural cabinet 12 as an insulating member.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A method of forming a vacuum insulated structure, the method comprising steps of:
   attaching an inner liner to an outer wrapper to define a structural cabinet, the outer wrapper defining a plurality of outer surfaces of the structural cabinet and the inner liner defining a plurality of inner compartment surfaces of the structural cabinet;
   attaching an expanding device to the plurality of outer surfaces and the plurality of inner compartment surfaces of the structural cabinet;
   expanding an interior cavity of the structural cabinet by pulling the plurality of outer surfaces away from the plurality of inner compartment surfaces and also pulling the plurality of inner compartment surfaces away from the plurality of outer surfaces to define an expanded interior volume of the structural cabinet;
   disposing an insulating material within the expanded interior volume of an insulating cavity, wherein the insulating material occupies substantially all of the expanded interior volume;
   expressing gas from the insulating cavity via a vacuum port of the structural cabinet, wherein expression of the gas at least partially draws the plurality of outer surfaces toward the plurality of inner compartment surfaces and partially draws the plurality of inner compartment surfaces toward the plurality of outer surfaces to define a final state of the structural cabinet, the final state defined by a contracted interior volume that is less than the expanded interior volume and corresponds to a densified state of the insulating material within the insulating cavity; and
   closing the vacuum port to hermetically seal the insulating cavity.

2. The method of claim 1, wherein the expanding device includes a plurality of pulling pads that engage the plurality of outer surfaces of the outer wrapper and the plurality of inner compartment surfaces of the inner liner, respectively, and wherein each respective pulling pad of the plurality of pulling pads is adapted to cover at least 50 percent of an expandable surface to which the respective pulling pad attaches, each expandable surface being one of the outer surfaces and the inner compartment surfaces.

3. The method of claim 2, wherein the outer wrapper is a metallic member and the plurality of pulling pads that engage the plurality of outer surfaces of the structural cabinet include a magnetic attachment mechanism, and wherein the magnetic attachment mechanism is an electromagnet that is operable to selectively define a magnetic field to attach to one of the plurality of outer surfaces of the outer wrapper.

4. The method of claim 2, wherein the inner liner is a plastic member and the plurality of pulling pads that engage the plurality of inner compartment surfaces of the inner liner include a suction-type attachment mechanism, and wherein the suction-type attachment mechanism is in communication with a vacuum pump.

5. The method of claim 2, wherein the plurality of pulling pads that engage the plurality of inner compartment surfaces are connected together via a linkage mechanism, wherein the linkage mechanism is coupled to a pulling device, and wherein the pulling device and the linkage mechanism cooperate to translate a single pulling force exerted in a first direction into a plurality of subsidiary pulling forces that are exerted to pull each of the plurality of inner compartment surfaces in a generally perpendicular direction with respect to a respective opposing outer surface of the outer wrapper.

6. The method of claim 1, wherein an expanded state of the structural cabinet includes a wall thickness that is in a range of from approximately 2 millimeters to approximately 6 millimeters thicker than the wall thickness of the structural cabinet in the final state.

7. The method of claim 1, wherein the step of expressing the gas from the insulating cavity via the vacuum port of the structural cabinet causes a compression of the insulating material that compacts the insulating material to define the densified state.

8. The method of claim 7, wherein the densified state of the insulating material resists inward bowing of the inner liner and the outer wrapper.

9. A method of forming a vacuum insulated structure, the method comprising steps of:
   forming a structural envelope;
   attaching an expanding device to an outer surface of the structural envelope;
   expanding an interior cavity of the structural envelope by pulling portions of the outer surface away from the interior cavity to define an expanded interior volume of the structural envelope;
   disposing an insulating material within the expanded interior volume of the interior cavity to define an insulating cavity, wherein the insulating material occupies substantially all of the expanded interior volume;
   expressing gas from the insulating cavity via a vacuum port of the structural envelope, wherein expression of the gas at least partially draws the portions of the outer surface inward and toward the insulating material to define a final state of the structural envelope, the final state defined by a contracted interior volume that is less than the expanded interior volume and corresponds to a densified state of the insulating material within the insulating cavity; and
   closing the vacuum port to seal the insulating cavity.

10. The method of claim 9, wherein the structural envelope is an insulated panel, and wherein the step of attaching the expanding device includes placing the insulated panel within a retaining structure that engages a perimetrical edge of the insulated panel.

11. The method of claim 10, wherein the retaining structure maintains the perimetrical edge of the structural envelope in a consistent shape during the step of attaching the expanding device and the step of expressing the gas.

12. The method of claim 10, wherein the step of attaching the expanding device further includes attaching the expanding device to two opposing outer walls of a structural panel.

13. The method of claim 9, wherein the structural envelope is a structural cabinet that includes an outer wrapper and an inner liner, wherein the outer surface includes a plurality of outer wrapper surfaces of the outer wrapper of the structural cabinet and the inner liner defining a plurality of inner compartment surfaces of the structural cabinet.

14. The method of claim 13, wherein the step of attaching the expanding device includes attaching the expanding device to the plurality of outer wrapper surfaces and the plurality of inner compartment surfaces of the structural cabinet.

15. The method of claim 14, wherein the step of expanding the interior cavity of the structural envelope includes pulling the plurality of outer wrapper surfaces away from the plurality of inner compartment surfaces and also pulling the plurality of inner compartment surfaces away from the plurality of outer wrapper surfaces to define the expanded interior volume of the structural cabinet.

16. The method of claim 15, wherein the expanding device includes a plurality of pulling pads that engage the plurality of outer wrapper surfaces of the outer wrapper and the plurality of inner compartment surfaces of the inner liner, respectively, and wherein each respective pulling pad is adapted to cover at least 50 percent of an expandable surface to which the respective pulling pad attaches, each expandable surface being one of the plurality of outer wrapper surfaces and the plurality of inner compartment surfaces.

17. The method of claim 9, wherein the expanding device includes expanding pads that are one of magnetically operated and suction-operated, wherein the expanding pads are attached to the portions of the outer surface of the structural envelope.

18. The method of claim 16, wherein the pulling pads that engage the plurality of inner compartment surfaces are connected together via a linkage mechanism, wherein the linkage mechanism is coupled to a pulling device, and wherein the pulling device and the linkage mechanism cooperate to translate a single pulling force exerted in a first direction into a plurality of subsidiary pulling forces that are exerted to pull each of the plurality of inner compartment surfaces in a generally perpendicular direction with respect to a respective opposing outer surface of the outer wrapper.

19. The method of claim 9, wherein an expanded state of the structural envelope includes a wall thickness that is in a range of from approximately 2 millimeters to approximately 6 millimeters thicker than the wall thickness of the structural envelope in the final state.

20. A method of forming a vacuum insulated panel, the method comprising steps of:
- forming a structural panel having opposing outer walls and a perimetrical edge that defines an interior insulating cavity;
- placing the structural panel within a retaining structure that engages the perimetrical edge;
- attaching an expanding device to the opposing outer walls;
- expanding the interior insulating cavity by pulling the opposing outer walls away from one another using the expanding device to define an expanded interior volume, adding an insulating material to the expanded interior volume;
- expressing gas from the expanded interior volume, wherein expression of the gas at least partially draws the opposing outer walls inward and toward one another and toward the insulating material to define a final state of the structural panel, the final state defined by a contracted interior volume that is less than the expanded interior volume and corresponds to a densified state of the insulating material within the interior insulating cavity, wherein the retaining structure maintains a position of the perimetrical edge during at least the step of attaching the expanding device and the step of expressing the gas; and
- closing a vacuum port to seal the interior insulating cavity.

* * * * *